United States Patent
Luo et al.

(12)

(10) Patent No.: US 10,599,774 B1
(45) Date of Patent: Mar. 24, 2020

(54) EVALUATING CONTENT ITEMS BASED UPON SEMANTIC SIMILARITY OF TEXT

(71) Applicant: Facebook, Inc., Menlo Park, CA (US)

(72) Inventors: Enming Luo, Fremont, CA (US); Emanuel Alexandre Strauss, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/905,709

(22) Filed: Feb. 26, 2018

(51) Int. Cl.
*G06F 17/27* (2006.01)
*G06N 3/04* (2006.01)

(52) U.S. Cl.
CPC ........... *G06F 17/2785* (2013.01); *G06N 3/04* (2013.01)

(58) Field of Classification Search
CPC ...... G06F 17/20; G06F 17/27; G06F 17/2785; G06F 17/279; G06F 16/367; G06F 11/07; G06F 11/14; G06F 11/1476; G06F 11/2263; G06F 2207/4802; G06F 2207/4818; G06F 2207/4824; G06F 17/21; G06F 17/2211; G06F 17/2247; G06F 17/227; G06F 17/2282; G06F 17/25; G06F 17/2705; G06F 17/271; G06F 17/274; G06F 17/2755; G06F 17/2765; G06F 17/277; G06F 17/2775; G06F 17/2795; G06F 17/28; G06F 17/2863; G06F 17/24; G06F 17/241; G06F 17/15; G06F 17/153; G06F 17/16; G06F 17/18; G06F 17/22; G06F 17/2229; G10L 15/08; G10L 15/16; G10L 15/1815; G10L 15/1822; G10L 15/183; G10L 15/19; G10L 15/193; G10L 15/197; G10L 25/27; G10L 25/30

USPC ......... 704/4, 8, 9, 200, 200.1, 202, E17.005, 704/E15.024, E15.021, E15.022, E15.023
See application file for complete search history.

(56) References Cited

U.S. PATENT DOCUMENTS

| 6,189,002 B1 * | 2/2001 | Roitblat | ............... G06F 16/30 |
| 2011/0282858 A1 * | 11/2011 | Karidi | ............... G06F 16/353 |
| | | | 707/709 |

(Continued)

OTHER PUBLICATIONS

Norouzi, M. et al., "Fast Searching in Hamming Space with Multi-Index Hashing," *Proceedings of the 2012 IEEE Conference on Computer Vision and Pattern Recognition (CVPR)*, Jul. 26, 2012, pp. 3108-3115.

*Primary Examiner* — Leshui Zhang
(74) *Attorney, Agent, or Firm* — Fenwick & West LLP

(57) ABSTRACT

A content review system for an online system automatically determines if received content items to be displayed to users contain text that violates a policy of the online system. The content review system generates a semantic vector representing semantic features of text extracted from the content item, for example, using a neural network. By comparing the semantic vector for the extracted text with stored semantic vectors of extracted text previously determined to violate one or more policies, the content review system determines whether the content item contains text that also violates one or more policies. The content review system also reviews stored semantic vectors previously determined to be unsuitable, in order to remove false positives, as well as unsuitable semantic vectors that are sufficiently similar to known suitable semantic vectors and as such may cause content items having suitable text to be erroneously rejected.

20 Claims, 6 Drawing Sheets

(56) References Cited

U.S. PATENT DOCUMENTS

| | | | | |
|---|---|---|---|---|
| 2013/0041652 A1* | 2/2013 | Zuev | ............ | G06F 17/2755 704/8 |
| 2015/0199333 A1* | 7/2015 | Nekhay | ............ | G06F 17/278 704/9 |
| 2015/0278200 A1* | 10/2015 | He | ............ | G06F 17/2785 704/2 |
| 2016/0147736 A1* | 5/2016 | Danielyan | ............ | G06F 17/2785 704/9 |
| 2016/0275058 A1* | 9/2016 | Starostin | ............ | G06F 16/367 |
| 2017/0083508 A1* | 3/2017 | Dixon | ............ | G06F 16/3337 |
| 2017/0177712 A1* | 6/2017 | Kopru | ............ | G06F 17/289 |
| 2018/0174579 A1* | 6/2018 | Henry | ............ | G10L 15/197 |

\* cited by examiner

EVALUATING CONTENT ITEMS BASED UPON SEMANTIC SIMILARITY OF TEXT

BACKGROUND

This invention generally relates to the analysis of content items provided by online systems to users, and in particular to semantic analysis and classification of content items provided by an online system based on machine learning, for example, using neural networks.

In many online systems, such as social networking systems, users are able to connect to and communicate with other users of the online system. For example, an online system may allow for users to share content with other users of the online system by providing content items to the online system for presentation to the other users. In addition, content publishers may be able to submit content items to the online system for presentation to users of the online system. The content items may comprise text data, as well as image data, audio data, video data, and/or any other type of content that may be communicated to a user of the online system.

To ensure a high quality user experience, an online system may remove or prevent certain types of content items from being displayed to users, based on text data associated with each content item. The types of content items that can be displayed to users of the online system may be restricted by one or more policies. For example, a particular online system may have a policy that disallows display of content items having text associated with certain categories of content (e.g., adult content, illegal content, and/or the like).

The online system may maintain a review process to identify instances of content items having text that violates one or more policies, and are thus unsuitable for display to users. For example, human reviewers may manually review received content items in order to determine their suitability for display. An online system may receive a large number of content items to be reviewed, for example, hundreds of thousands of content items in a few days or a week. Use of humans for reviewing content items is a slow and expensive process. Existing automatic techniques, for example, searching for offensive keywords are often unable to identify several complex policy violations. Therefore, conventional techniques for identifying content items that violate policies of the online system are ineffective, expensive, and time-consuming.

SUMMARY

Embodiments perform semantic analysis of content items and for automatically determining if content items violate one or more policies of an online system based upon semantic vector templates. A policy specifies attributes of content items that are suitable for presenting to users. For example, a policy may specify that content items including profanity are not suitable for presenting to users.

A content review system for an online system automatically determines if received content items to be displayed to users contain text that violates a policy of the online system. The content review system generates a semantic vector representing semantic features of text extracted from the content item, for example, using a neural network. By comparing the semantic vector for the extracted text with stored semantic vectors of extracted text previously determined to violate one or more policies, the content review system determines whether the content item contains text that also violates one or more policies. The content review system also reviews stored semantic vectors previously determined to be unsuitable, in order to remove false positives, as well as unsuitable semantic vectors that are sufficiently similar to known suitable semantic vectors and as such may cause content items having suitable text to be erroneously rejected.

The online system receives a content item and extracts text associated with the content item. The online system determines a semantic vector of the extracted text indicating one or more semantic features of the extracted text, by providing the extracted text as input to a deep neural network having a plurality of layers, and determining the semantic vector representing the extracted text based upon an output of a hidden layer of the deep neural network. The online system further identifies a set of stored unsuitable semantic vectors that have been previously determined to be unsuitable under a policy of the online system, the policy specifying one or more attributes of content items considered unsuitable for presenting to users of the online system. Based upon the stored unsuitable semantic vectors, the online system determines a distance metric value between the determined semantic vector and one or more semantic vectors of the set of unsuitable semantic vectors, and, responsive to determining that the distance metric value is below a threshold value, determining that the content item is likely to violate the policy associated with the set of unsuitable semantic vectors. Responsive to determining that the input content item is likely to violate the policy, the online system withholds the content item from users of the online system.

In some embodiments, the online system is configured to review the stored unsuitable vectors in order to remove false positives and vectors that do not serve as a good indication as to whether their corresponding text violates a policy. The online system may identify a set of stored suitable semantic vectors that have each been previously determined to be suitable under the policy of the online system. For an unsuitable semantic vector of the set of unsuitable semantic vectors, the online system determines a number of sematic vectors from the set of suitable semantic vectors that are within a threshold distance of the unsuitable semantic vector, and, in response to a determination that the number of suitable semantic vectors within the threshold distance meets or exceeds a threshold value, removes the unsuitable semantic vector from the set of unsuitable semantic vectors.

In some embodiments, the online system accesses a set of records of previous instances of agent review of content items to generate a cluster corresponding to previous instances of a particular semantic vector associated with previous content items received by the online system. The online system determines a label for each instance of the semantic vector of the generated cluster, each label indicating whether the corresponding instance of the semantic vector was previously determined by the agent to be likely to violate a policy of the online system. Based upon the determined labels, the online system determines whether the semantic vector likely violates a policy of the online system (e.g., based upon majority vote).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
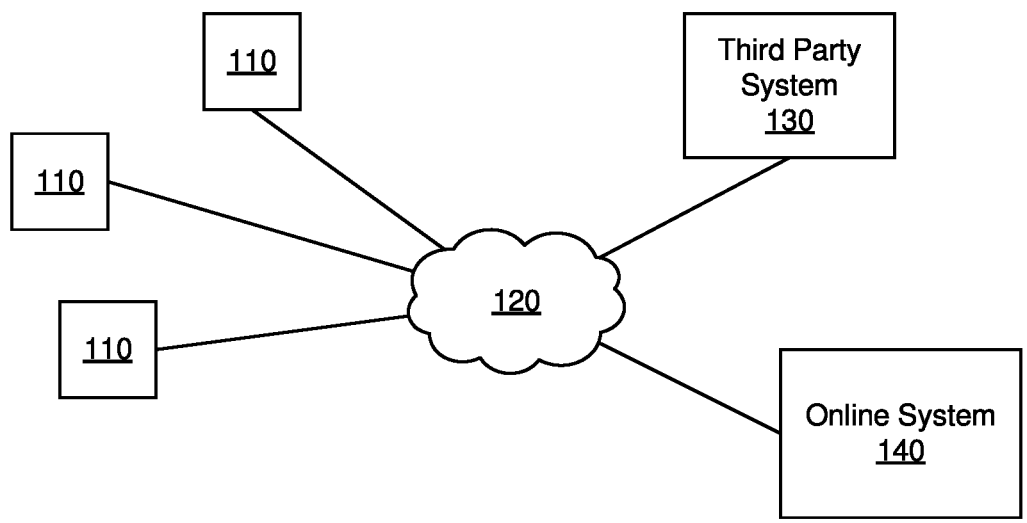
FIG. 1 is a block diagram of a system environment for an online system.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
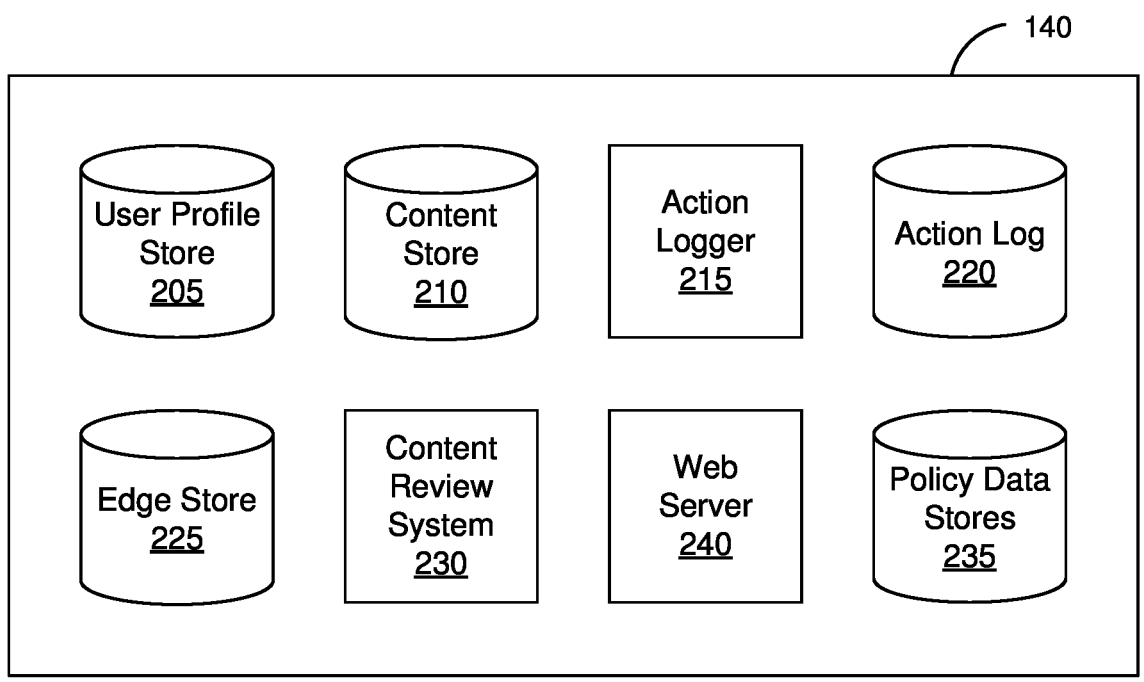
FIG. 2 is a block diagram of an architecture of the online system illustrated in FIG. 1.

FIG. 2 is a block diagram of an architecture of the online system 140. The online system 140 shown in FIG. 2 includes a user profile store 205, a content store 210, an action logger 215, an action log 220, an edge store 225, a content review system 230, a policy data store 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 may be associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent pieces of content, or "content items.". Hence, online system users are encouraged to communicate with each other by posting content items to the online system 140 through various communication channels. This increases the amount of interaction of users with each other and increases the frequency with which users interact within the online system 140.

In some embodiments, each content item may be associated with at least one piece of text. For example, a content item may correspond to a status update or other type of posting comprising text. In some embodiments, a content item may comprise media content such as an image or a video, the media content containing text or associated with textual metadata. In some embodiments, a content item may correspond to a link pointing to a landing page containing text.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Each user or object can be represented as a node in the social network and the nodes are connected to each other via edges. In one embodiment, the nodes and edges form a complex social network of connections indicating how users and/or objects are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content review system 230 is configured to review content items (e.g., content stored in the content store 210) intended for display to users of the online system 140. The online system 140 may have one or more policies restricting the types of content items that may be displayed (e.g., stored in the policy data store 235). Each policy may correspond to a type of restricted content, such as content soliciting the selling/purchase of certain types of goods or services, content containing profanity, sexual content, violent content, racist content, illegal content, and/or the like, wherein content items depicting restricted content are deemed unsuitable for display to users of the online system 140. In some embodiments, a policy may apply to only a subset of the users of the online system 140 (e.g., a particular policy may restrict certain content from being displayed to users below a threshold age, while the content may be displayed to users above the threshold age) or only to certain contexts of the online system (e.g., a policy restricting certain content may be enforced when a user is accessing a social page of the online system, but not when accessing a marketplace page of the online system). In some embodiments, the content review system 230 extracts text associated with each content item, and determines if the text associated with each content item violates one or more policies.

In some embodiments, the online system 140 comprises policy data stores 235 that store information associated with one or more policies. As discussed above, the online system 140 may have one or more policies restricting the types of content items that may be displayed. The policy data stores 235 may store a policy object corresponding to each policy. The policy object for a policy may specify various attributes of the policy such as a policy name/identifier, types of content that the policy applies to, attributes of users to which the policy applies, etc. In some embodiments, a policy object stores one or more rules specifying types of content items that conform to the policy or violate the policy.

In addition, the policy data stores 235 may store information associated with content items that have violated one or more policies. For example, information associated with content items that have been previously determined to violate a particular policy may be used to identify other content items that also violate the particular policy. In some embodiments, each policy is associated with a corresponding data store indicating content items that have been determined to violate the policy. In some embodiments, the information corresponding to content items associated which each policy (e.g., content items determined to violate the policy) are stored in separate databases (e.g., such that each policy is associated with a separate database), in separate tables or sets of tables of one or more databases, in separate portions of the same table (e.g., identified using a policy ID or other parameter), and/or the like.

The policy data stores 235 may store the actual content items, extracted text associated with the content items, or representations of the content items or text associated with the content items (e.g., a semantic vector corresponding to the content item or content item text, discussed in greater detail below). The content review system 230 may use policy data stores 235 to analyze received content items to determine the suitability of the content items for display. For example, the content review system 230 may compare text associated with a received content item (or a semantic representation thereof) with the data of the policy data stores 235 to determine how similar the content item is to previous content items found violating one or more policies, and to determine whether to allow the content item based upon the determination.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Displaying Content Items, and Content Item Policies

An online system (e.g., online system 140) may receive content items from various sources, such as from users of the online system (e.g., users of the client devices 110) or from third party systems (e.g., third party system 130). The received content items may be displayed to users of the online system (e.g., through client devices 110). For example, if the online system corresponds to a social network, the content item may correspond to a piece of content shared by a first user to one or more additional users, a sponsored content item, for example, an advertisement to be displayed to one or more users, and/or the like. The content items may be associated with any type of content, such as text, image content, audio content, video content, or any combination thereof.

As discussed above, the online system may restrict the types of content items that can be received by users of the online system, based upon one or more policies. Each policy may specify a different type of content that is disallowed for display to one or more users of the online system. For example, the online system may have a first policy that disallows content items that relate to adult content to be displayed to users, and a second policy that disallows content items relating to drug use, etc. In some embodiments, a policy may be applied to only a subset of users of the online system (e.g., content items that violate the policy cannot be displayed to users within the subset, but may be displayed to other users outside the subset). A subset of users is characterized by sets of user profile attribute values or ranges of user profile attribute values. For example, a set of user may comprise users of a particular gender that are of an age within a particular range of values (e.g., males between ages 10 and 20). In some embodiments, a policy may be applied based upon an interaction context associated with users of the online system. For example, a particular policy may prohibit content items soliciting sale of goods in a first context (e.g., a status update context), but allow such content items to be displayed in a second context (e.g., a marketplace context associated with the online system).

In some embodiments, the online system receives content items from various content creators, and automatically extracts text from the received content items and analyzes the extracted text to determine whether or not the content items are likely to violate any of one or more policies. A content creator may also be referred to as a content provider or a content provider system. If the online system determines that a content item is likely to violate a particular policy, then the online system prevents the content item from being displayed to users of the online system. In some embodiments, the online system determines whether the content item is likely to violate a policy by comparing a representation of the content item (e.g., a semantic vector corresponding to the content item) with representations of one or more content items that have previously been determined to violate the policy In some embodiments, different content items may contain text that is different but semantically similar. For example, content creators of policy-violating content items may create different variations of content items having text that is visually different (e.g., different order of words, additional filler words, etc.) but which is semantically similar or identical. For example, a first content item may be associated with the text "Lawnmower for sale: $100," while a second item may be associated with the text "Anyone want to buy a lawnmower?" While the actual text in the first and second content items is different, they may be considered semantically similar to the extent that if the first content item violates a particular policy (e.g., a policy prohibiting content items advertising sale of certain types of goods), then the second content item most likely would also violate the particular policy. As such, a simple text comparison or keyword search may not be sufficient to identify content items that are semantically similar variations of each other.

In some embodiments, the online system performs semantic analysis of the text associated with content items to determine semantic similarities of different content items. Each piece of extracted text is associated with semantic features indicating a context of the text, a subject of the text, an objective of the text, and/or the like. By extracting the semantic features of the text associated with different content items, the extracted text of the content items can be compared with each other to determine a level of similarity that ignores non-substantive variations between the content items (such as different phrasing, word order, and/or the like).

Figure 3:
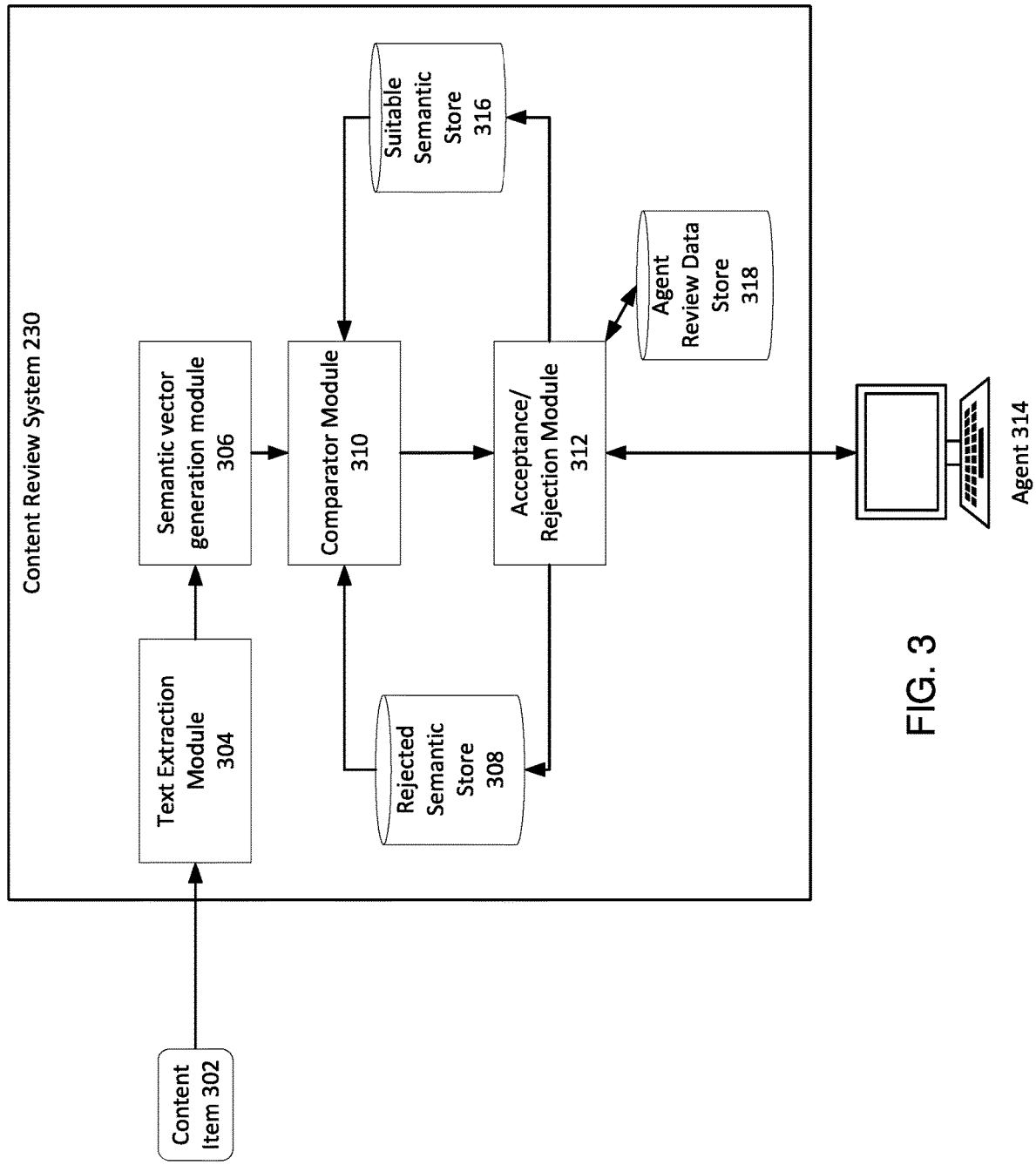
FIG. 3 illustrates a block diagram of a content review system, in accordance with some embodiments.

FIG. 3 illustrates a block diagram of a content review system, in accordance with some embodiments. The content review system 230 illustrated in FIG. 3 may correspond to the content review system 230 illustrated in FIG. 2. The content review system 230 is configured to receive a content item 302, and to determine whether the content item 302 is suitable for display to the users of the online system (e.g., whether the content item 302 likely violates any policies of the online system that would render the content item 302 unsuitable for display to the users). In some embodiments, the content item 302 is received from a content creator (e.g., a user of the online system, a user of a third party system, such as an advertiser, and/or the like). In some embodiments, the content item 302 may comprise one or more pieces of text, an image or other type of media containing text or associated with textual metadata, a link to a landing page containing text, and/or the like. In some embodiments, the content item 302 is received by the content review system 230 as a screenshot of a video or a landing page corresponding to the content item. As used herein, the term "suitable" may be used to refer to a content item where the extracted text of the content item is determined to not violate any of a plurality of policies, while the term "unsuitable" may refer to a content item having text that violates at least one policy.

The content review system 230 comprises a text extraction module 304 configured to extract text from the content item 302. In some embodiments, the text extraction module 304 determines a type of the received content item 302 in order to extract text from the content item 302. For example, where the content item 302 comprises text, the text extraction module 304 merely returns the text. In some embodiments, the text extraction module 304 may perform character recognition to extract text displayed in an image or video. In some embodiments, if the content item comprises audio signals, the text extraction module 304 performs transcription of the audio signal to convert at least a portion of the audio signals to text. In some embodiments, the text extraction module 304 may access a landing page associated with the content item 302 and extract text from the landing page.

The content review system 230 further comprises a semantic vector generation module 306 that generates a semantic vector corresponding to the extracted text of the content item 302. The semantic vector indicates semantic features of the extracted text the content item 302. The semantic features that may be represented in the semantic vector of the content item 302 may include a context or objective associated with the extracted text, one or more subjects of the extracted text, descriptors of one or more subjects of the extracted text, and/or the like. For example, the content review system 230 may use a feature extraction algorithm to identify semantic features within the extracted text. Content items having extracted text with similar semantic features will have similar corresponding semantic vectors. As such, semantic vectors corresponding to the extracted text of different content items can be compared in order to determine a level of semantic similarity between the extracted text of the different content items. Accordingly, if each vector was represented as a point in a multidimensional space, two text strings with similar semantic features will correspond to points that are close to each other in the multidimensional space, while text strings with different semantic features corresponds to points that are far apart in the multidimensional space. As a result, the distance between two points corresponding to two text strings is indicative of the semantic similarity between the two text strings.

In some embodiments, the semantic vector generation module 306 comprises a convolutional neural network configured to receive the extracted text of the content item 302 from the text extraction module 304, and to extract one or more semantic features of the received content item 302. In some embodiments, the neural network outputs a plurality of semantic features each corresponding to a probability score indicating a likelihood that the respective semantic feature is actually included in the extracted text of the content item 302. For example, where the content item 302 comprises text indicating an offer to sell a particular product, the neural network may output a first semantic feature "offer to sell" with a first probability score, and a second semantic feature corresponding to the particular product with a second probability score. In some embodiments, the neural network may extract multiple semantic features corresponding to multiple subjects described by the extracted text corresponding to the received content item 302.

Figure 4:
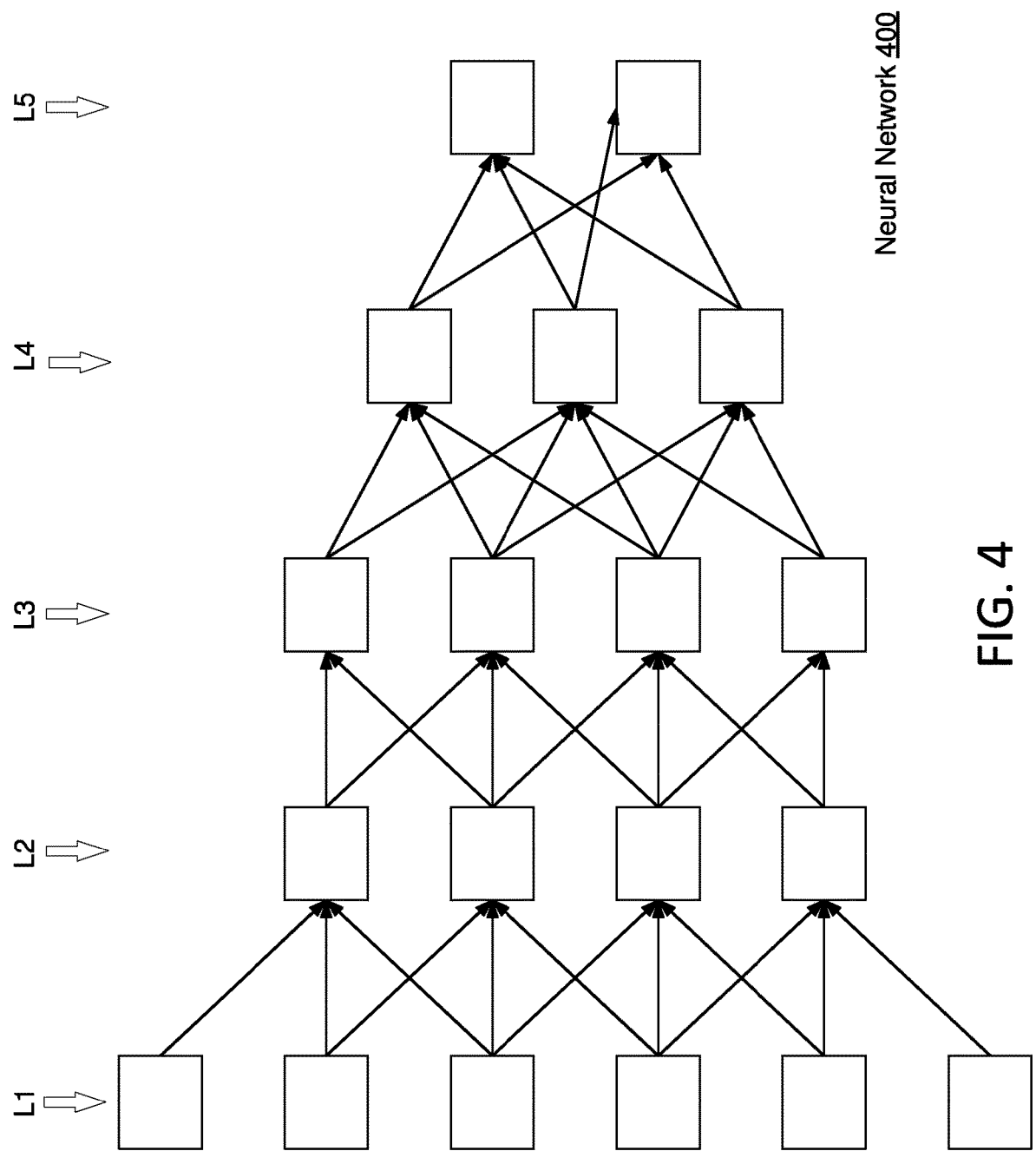
FIG. 4 illustrates an example neural network that may be used to generate a semantic vector for the extracted text a received content item, in accordance with some embodiments.

FIG. 4 illustrates an example neural network that may be used to generate a semantic vector for the extracted text a received content item, in accordance with some embodiments. The neural network 400 comprises a plurality of layers (e.g., layers L1 through L5), each of the layers comprising one or more nodes. Each node has an input and an output, and is associated with a set of instructions corresponding to the computation performed by the node. The set of instructions corresponding to the nodes of the neural network may be executed by one or more computer processors. The neural network 400 may also be referred to as a deep neural network.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

The first layer of the neural network 400 (e.g., layer L1) may be referred to as the input layer, while the last layer (e.g., layer L5) is referred to the output layer. The remaining layers between the input and output layers (e.g., layers L2, L3, L4) are hidden layers. Accordingly, nodes of the input layer are input nodes, nodes of the output layer are output nodes, and nodes of the hidden layers are hidden nodes. Nodes of a layer may provide input to another layer and may receive input from another layer. For example, nodes of each hidden layer are associated with two layers (a previous layer and a next layer). The hidden layer receives the output of the previous layer as input and provides the output generated by the hidden layer as input to the next layer. For example, nodes of hidden layer L3 receive input from the previous layer L2 and provide input to the next layer L4.

The neural network 400 is configured to determine semantic features of the extracted text of received content items. The layers of the neural network 400 are configured to identify features within the extracted text. In some embodiments, early layers of the neural network 400 (e.g., layers closer to the input layer) may be convolutional layers configured to capture syntactic meanings of the extracted text, while later layers of the neural network 400 (e.g., layers closer to the output layer) may be configured to capture semantic meanings of the extracted text. In some embodiments, the layers of the neural network 400 perform recognition of syntactic and/or semantic features by clustering, classification, matching, and/or the like.

In some embodiments, the output of the last hidden layer of the neural network 400 (e.g., the last layer before the output layer, illustrated in FIG. 4 as layer L4) is used as the semantic features of the extracted text. The output layer of the neural network 400 outputs one or more scores associated with the input text. In some embodiments, the neural network may be an autoencoder that simply recreates the input as the output.

The last hidden layer of the neural network 400 outputs a vector representation of the semantic features of the extracted text, referred to as an embedding. In some embodiments, the neural network applies a hash function to the determined semantic features to generate a semantic vector. As such, the extracted text of the content item can be represented using a hash value generated by applying a hash function to the embedding obtained from the hidden layer of a neural network processing the content item. In some embodiments, the hash function preserves distances between the semantic features of different pieces of extracted text in an original distance space by minimizing quantization loss.

The semantic vector representing the extracted text of content item 302 may be expressed as a 256 bit vector that encodes the semantic features extracted as embeddings from the neural network. In some embodiments, the hash value corresponding to the extracted text is represented as a binary vector, where certain semantic features of the extracted text map to substrings of the binary vector. A substring may represent consecutive bits of the binary vector or bits in various positions within the binary vector.

In some embodiments, the network characteristics of the neural network (e.g., weights between nodes) may be updated using machine learning techniques. For example, the neural network 400 may be provided with a training set comprising known pieces of text. The determined semantic features of the text may be compared to the actual expected semantic features associated with each piece of text, whereupon the comparison is used to update the network characteristics of the neural network. For example, the neural network may be trained to more easily recognize specific types of semantic features in received text. In some embodiments, the network characteristics of the neural network are learned by optimizing a loss function using backpropagation.

The semantic vector generation module 306 may generate the semantic vector such that semantic features that are similar to each other will map to strings with small distances between them, while semantic features that are dissimilar are mapped to strings with larger distances between them. As used herein, the term "distance" may correspond to any type of measurement that indicates a degree of similarity between two vectors. For example, in some embodiments, the distance between different semantic vectors may correspond to a Euclidean distance between the vectors. In embodiments where the semantic vectors are expressed as binary vectors, a distance between the vectors may correspond to a Hamming distance.

In some embodiments, it may be possible for a particular semantic vector to correspond to the extracted text of different content items. This may occur if there are only minor differences between the semantic features of the extracted text of the different content items. As the differences of the semantic features between different pieces of extracted text increases, the distance between the corresponding semantic vectors may increase.

As discussed above, the online system maintains one or more policies restricting the types of content items that can be received by users of the online system. In some embodiments, each policy is associated with a respective data store 308 (hereinafter also referred to as a rejected semantic store 308). For example, as illustrated in FIG. 3, the content review system 230 is able to access a rejected semantic store 308 corresponding to a particular policy of the online system. The content review system 230 may also access additional data stores (not shown) corresponding to additional policies associated with the online system, each data store storing one or more semantic vectors corresponding to extracted text of one or more content items determined to violate the respective policy associated with the data store. In some embodiments, the semantic vectors associated with different policies may be stored within the same data store. For example, semantic vectors associated with a plurality of policies may be stored using different tables within a data store, or within the same table within a data store (wherein a policy ID is used to filter out subsets of semantic vectors corresponding to a particular policy).

The content review system 230 comprises a comparator module 310 which receives the semantic vector corresponding to the extracted text of the content item 302 generated by the semantic vector generation module 306, and compares the received semantic vector to one or more stored semantic vectors of the rejected semantic store 308.

In some embodiments, the comparator module 310 compares the received semantic vector of the extracted text of the content item 302 with the stored semantic vectors of the rejected semantic stores 308 corresponding to one or more policies, by determining a distance between the semantic vector of the extracted text and stored semantic vectors of the rejected semantic store 308. Where the semantic vector of the extracted text comprises an embedding representing the extracted text obtained from a hidden layer of a neural network, the determined distance may correspond to a Euclidean distance. Alternatively, where the semantic vector of the extracted text corresponds to a binary vector, the determined distance may be a Hamming distance. In some embodiments, the comparator module 310 determines a shortest distance between the semantic vector of the extracted text of the content item 302 and any of the semantic vectors of a respective rejected semantic store.

The content review system 230 comprises an acceptance/rejection module 312 that receives the determined distances from the comparator module 310, and determines whether the content item 302 is suitable (e.g., allowed to be displayed to the users of the online system) or unsuitable (e.g., disallowed from being displayed to the users of the online system) based on the received distances. The received distances may correspond to the shortest distance between the semantic vector of the extracted text of the content item 302 and any of the semantic vectors stored by the rejected semantic store 308 corresponding to a particular policy maintained by the online system. In some embodiments, the acceptance/rejection module 312 receives a plurality of distances, each corresponding to a shortest distance between the semantic vector of the extracted text of the content item 302 and any of the stored semantic vectors associated with a respective policy. In some embodiments, the acceptance/rejection module 312 receives a distance corresponding to the shortest distance between the semantic vector of the extracted text of the content item 302 and any of the stored semantic vectors associated with a plurality of policies, and an indication of a policy of the plurality of policy associated with the received distance.

In some embodiments, the acceptance/rejection module 312 compares the received distance(s) to one or more threshold values. Each threshold value indicates a distance (between the semantic vector of the extracted text of the content item 302 and a closest semantic vector stored in a rejected semantic store) at which the likelihood of the extracted text of the content item 302 violating the respective policy exceeds a certain amount. For example, the one or more threshold values may comprise a first threshold value indicating a distance at which the likelihood of the extracted text of the content item 302 violating the policy exceeds 90%, and a second threshold value indicating a distance at which the likelihood of the extracted text of the content item 302 violating the policy exceeds 60%. In some embodiments, different policies may be associated with different threshold values. The acceptance/rejection module 312 determines whether the content item 302 should be allowed or disallowed under the respective policy, based upon the comparison of the received distances to the threshold values. For example, if the received distance is greater than a particular threshold value, the acceptance/rejection module 312 may indicate that the extracted text of the content item 302 likely does not violate the policy, and allow the content item 302 to be displayed to users of the online system. On the other hand, if the received distance is less than a particular threshold value, the acceptance/rejection module 312 may indicate that the extracted text of the content item 302 likely violates the policy, and disallows display of the content item 302.

In some embodiments, if the extracted text of the content item 302 is determined to likely violate a particular policy, then the semantic vector of the extracted text is added to the rejected semantic store 308 corresponding to the policy. In some embodiments, if the extracted text of the content item 302 is determined to not violate any of the plurality of policies, the extracted text (or its corresponding semantic vector) may be stored in a suitable semantic store 316, which stores extracted text (or semantic vectors of extracted text of content items) determined to be acceptable under the plurality of policies.

In some embodiments, the acceptance/rejection module 312 may base its determination of the suitability of the extracted text of the content item 302 upon review by an agent. For example, the acceptance/rejection module 312 may submit the extracted text to an agent 314 for evaluation (e.g., by enqueuing the content item 302 and/or the extracted text of the content item 302 into review queue accessible by the agent 314). In some embodiments, the agent 314 corresponds to a human agent, who may manually indicate whether the extracted text violates a policy or is acceptable under the plurality of policies. In other embodiments, the agent 314 corresponds to an automated agent, such as an expert system. In some embodiments, the acceptance/rejection module 312 only submits the extracted text for review by the agent 314 under certain circumstances (e.g., if the received distance between the semantic vector of the extracted text and the closest semantic vector of the respective data store is between a first threshold and a second threshold value). In some embodiments, the agent 314 reviews only the extracted text of the content item 302 to determine whether the extracted text violates one or more policies. In other embodiments, the agent 314 may review the content item 302 as a whole in order to determine whether the content item 302 contains text that violates one or more policies. In some embodiments, the acceptance/rejection module 312 uses the results of the agent review to update an agent review data store 318, which stores a record of results of previously performed instances of agent review. For example, the agent review data store 318 may comprise a table or other data structure indicating the semantic vectors associated with the content items 302 reviewed by the agents 314, as well as the results of each review (e.g., which policies the content item 302 violated, if any).

In some embodiments, the acceptance/rejection module 312 may process semantic vectors differently based upon different policies maintained by the content review system 230. For example, the content review system 230 may maintain a first policy under which received content items 302 undergo "automatic evaluation" (e.g., as described above). As such, when a semantic vector corresponding to extracted text of a content item 302 is received, if the semantic vector is the same or within a threshold distance of a semantic vector stored in the rejected semantic store 308 corresponding to the first policy, the content item 302 can be automatically rejected and prevented from being displayed to users.

On the other hand, the content review system 230 may also maintain a second policy under which received content items 302 undergo agent review regardless of whether the semantic vectors associated with the content items 302 are similar to those stored in the rejected semantic store 308. For example, when the semantic vector for the content item 302 is received, if the semantic vector is within a threshold distance of a semantic vector of the rejected semantic store 308 corresponding to the second policy, the semantic vector may be added to the rejected semantic store 308, but the content item 302 is not automatically rejected and prevented from being displayed to users. Instead, the content item 302 and/or its extracted text are enqueued for review by the agent 314, regardless of the results of the comparison between the semantic vector for the content item 302 and the stored semantic vectors of the rejected semantic store 308. The content item 302 is then deemed suitable for display to users or unsuitable and prevented from being displayed to users, based upon the results of the review by the agent 314. In some embodiments, the content item 302 is automatically enqueued for review by the agent 314 with regards to the second policy only if the content item 302 is not automatically determined to be unsuitable by a policy using "automatic evaluation" as described above.

In some embodiments, whether a particular policy uses "automatic evaluation" or relies upon agent review for received content items 302 is based upon a level of confidence that the semantic vectors of the rejected semantic store 308 corresponding to the policy function as strong indicators as to the suitability of received content items 302 (e.g., how likely is it that a received content item 302 is actually unsuitable for display to users under the policy, if it is associated with a semantic vector within a threshold distance of a stored semantic vector of the rejected semantic store 308 for the policy?). In some embodiments, as agents 314 continue to evaluate various content items 302 with respect to a particular policy, the level of confidence associated with the policy may increase as additional content items 302 corresponding to the same or similar semantic vectors are reviewed. In some embodiments, if the level of confidence of a particular policy reaches a threshold amount, the policy may be used for "automatic evaluation" of content items, without the need for agent review for each future received content item (e.g., agent review only needed if the distance between the semantic vector for the content item 302 and a closest semantic vector of the rejected semantic store 308 is between a first and second threshold value).

Figure 5:
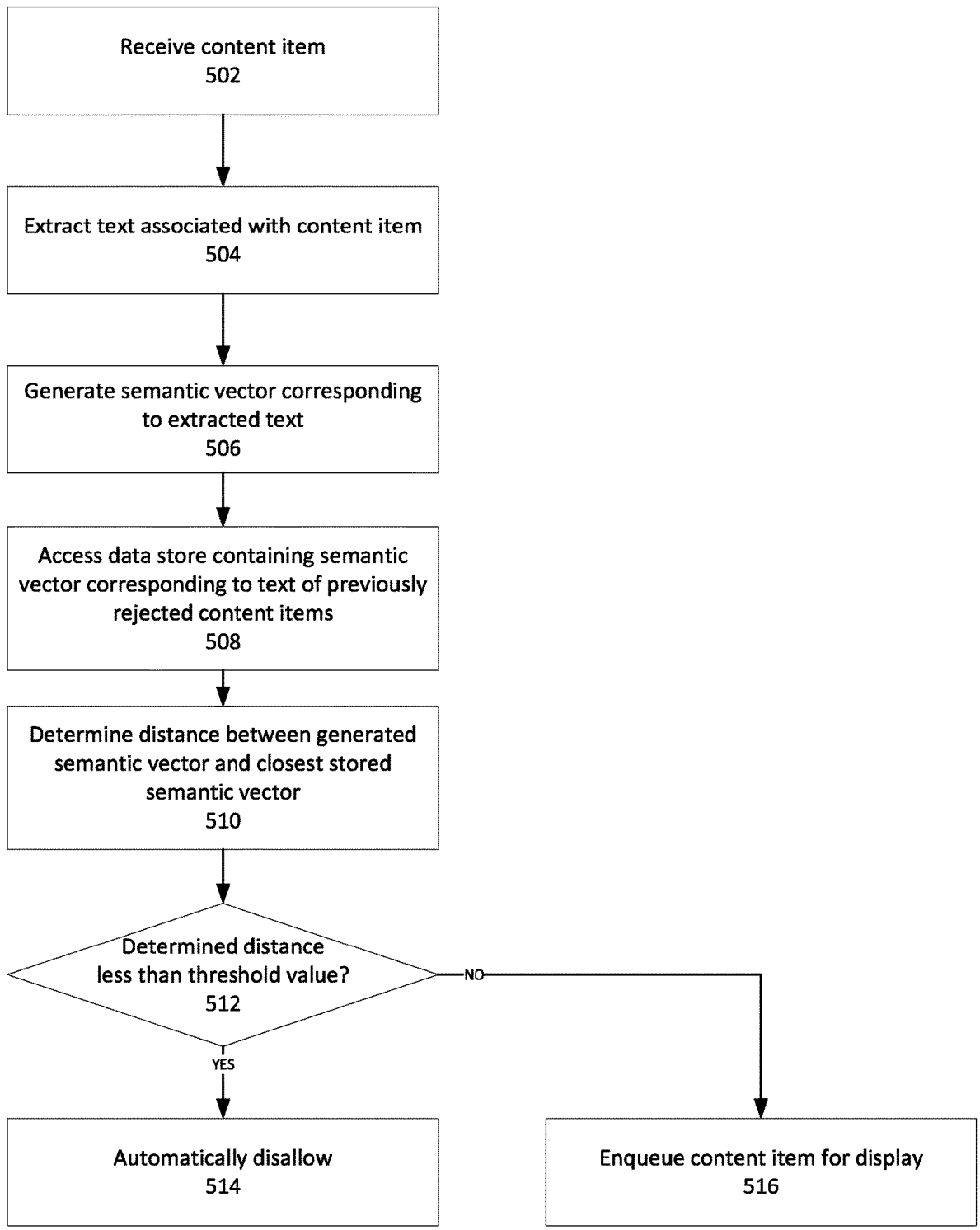
FIG. 5 illustrates a flowchart of a process performed by a content review system of an online system for reviewing received content items, in accordance with some embodiments.

FIG. 5 illustrates a flowchart of a process performed by a content review system of an online system for performing automatic evaluation of received content items, in accordance with some embodiments The content review system receives 502 a content item to be reviewed. The content item may correspond to any type of content, such as an image, text, audio, video, link, or any combination thereof. In some embodiments, the content item is received from a content creator to be displayed to one or more users of an online system, the content creator corresponding to a user of the online system, a third party system such as an advertiser, and/or the like.

The content review system extracts 504 text associated with the received content item. In some embodiments, where the content item comprises text or a text document, the content review system may use the text as the extracted text. If the content item comprises an image, video, or other media file, the content review system may utilize a character recognition algorithm to extract text from the image or video. In some embodiments, the content review system may extract text based upon metadata associated with the image or video. Where the content item comprises a link to a landing page, the extracted text may comprise text extracted from the landing page. If the content item comprises audio content, the extracted text may correspond to a transcription of at least a portion of the audio content.

The content review system generates 506 a semantic vector of the extracted text associated with the received content item. In some embodiments, the semantic vector comprises an embedding obtained from a hidden layer of a neural network processing the extracted text. In some embodiments, the semantic vector is a binary vector representing a hash value obtained by applying a hash function to the embedding obtained from a hidden layer of a neural network processing the extracted text. The semantic vector indicates semantic features of the extracted text, such as an intent or category of the text, descriptors of one or more subjects of the text, and/or the like.

The content review systems determines if the extracted text of the received content item likely violates any of the plurality of policies, based upon the generated semantic vector of the extracted text. To do so, the content review system, accesses 508 a data store for each of a plurality of policies. Each policy defines a set of rules disallowing certain types of content items for display to users of the online system. Each data store corresponding to a policy stores one or more semantic vectors corresponding to extracted text of content items that have been previously determined to violate the respective policy (and thus disallowed from being displayed to users).

For each of the accessed data stores, the content review system determines 510 a distance corresponding to a shortest distance between the semantic vector of the content item's extracted text and any of the semantic vectors stored by the data store. In some embodiments, the content review system determines a distance between the semantic vector of the extracted text to each of the stored semantic vectors of the data store, and selects a distance corresponding to the shortest distance. The determined distance may be a Euclidean distance or a Hamming distance.

In some embodiments, the content review system determines the distance based upon a similarity search. For example, the content review system may search the data store to identify a subset of the stored semantic vectors that are within a threshold distance of the semantic vector of the extracted text. The content review system may then compare each semantic vector of the identified subset with the semantic vector of the extracted text to determine a distance between the respective semantic vector and the semantic vector of the content item, whereupon a shortest distance between the semantic vector of the extracted text and a semantic vector of the data store can be identified.

In some embodiments, similar stored semantic vectors can be identified using multi-index hashing. The stored semantic vectors are split into multiple segments, and used to build separate multi-indexing tables. Search is performed on each indexing table to return stored semantic vectors where all segments of the vector are within a threshold distance from a corresponding segment of the semantic vector of the extracted text. The returned stored semantic vectors are analyzed to determine a shortest distance.

The content review system determines an action to be performed on the received content item based upon the determined shortest distance. For example, the content review system determines 512 if the determined distance is less than a threshold value. The threshold value corresponds to a distance at which content items associated with a semantic vector within the first threshold distance from any stored semantic vector of the data store is considered likely to violate the corresponding policy. In some embodiments, different distance values may be mapped to probabilities that the content item violates the policy, wherein the threshold value corresponds to a particular probability value (e.g., 90%). As such, if the determined distance is less than the threshold value, the received content item is considered to be likely violating the policy corresponding to the data store, and is disallowed 514 from being displayed to users of the online system. In addition, the semantic vector corresponding to the extracted text of the content item is added to the data store for the policy, if not already present.

On the other hand, if the determined distance is not less than the first threshold, the content review system determines 516 that the content item most likely does not violate the policy, and that the content item can be enqueued for display to users. In some embodiments, the content item is only enqueued if it is determined to not likely violate each of a plurality of different policies.

In some embodiments, the determined distance may be compared against multiple different threshold values associated with a respective policy. For example, a particular policy may be associated with at least a first threshold value and a second threshold value. The first threshold value may correspond to a distance at which content items associated with a semantic vector within the first threshold distance from any stored semantic vector of the data store is considered likely to violate the corresponding policy with a high probability (e.g., >90%), while the second threshold value may correspond to a distance associated with a lower probability of violating the policy (e.g., >50%). The content review system performs different actions on the content item based upon how the determined distance compares to the different threshold values. For example, if the determined distance is less than the first threshold value, then the content item may be automatically rejected (e.g., determined to violate the policy). If the determined display is greater than the second threshold value, then the content item may be automatically deemed to likely not violate the policy, and may be enqueued for display to users (assuming that the content item also does not violate other policies). On the other hand, if the determined distance is less than the second threshold value but greater than the first threshold value, the content review system may submit the content item for further review by an agent. In some embodiments, the agent corresponds to a human agent. In other embodiments, the content review may be performed by an automatic agent, for example, a process executing on an expert system. The agent reviews the content item and may determine whether or not the content item is suitable (e.g., not violating the policy) or unsuitable (e.g., violating the policy). If the content item is determined to not violate any of the policies of the plurality of policies, then the content item may be allowed to be displayed to users of the online system.

In some embodiments, the values of the first threshold and/or second threshold may be adjusted as additional semantic vectors are processed. For example, in an embodiment where it is determined that the stored semantic vectors of a rejected semantic store are causing large numbers of false positives (e.g., rejection of content items that do not violate policy, but are associated with semantic vectors within a first threshold distance of semantic vectors of content items that do violate policy), the first threshold for the policy may be adjusted to correspond to a smaller distance, in order to narrow the scope of semantic vectors that are rejected and prevent false positives.

In some embodiments, blocks 510 through 516 of the process illustrated in FIG. 5 are performed for each of the plurality of policies associated with the online system, such that the content item is disallowed from being displayed to users of the online system if it is determined likely to violate any one of the plurality of policies, and is allowed to be displayed if it is determined that it likely does not violate any of the plurality of policies. In some embodiments, if the content item is determined to be violate a particular policy, further analysis with regards to other policies may not be required.

In some embodiments, review by an agent may occur only after the semantic vector of the extracted text has been compared with the stored semantic vectors of each of the data stores corresponding to the plurality of policies. As such, the agent may review the extracted text against a plurality of different policies (e.g., each policy where the distance of semantic vector of the extracted text from the closest semantic vector of the respective data store was between the first and second thresholds for the policy). In other embodiments, where the content item is determined to have a moderate likelihood of violating a plurality of different policies, different agents may review the extracted text against different policies. In some embodiments, the semantic vector of the extracted text is added to the corresponding data store of each policy the content item is determined to violate (either through automatic determination or through agent review).

In some embodiments, review by the agent may be skipped if the content item is determined to likely violate any of the plurality of policies. For example, if the content item has already been determined to likely violate a first policy, either automatically or based upon agent review, then there may be no need for further review regarding a second policy.

Although the above process illustrates particular thresholds used for automatically reviewing content items for potential policy violations, it is understood that in other embodiments, different thresholds, or more or less thresholds, may be used. For example, in some embodiments, the policies associated with the online system may be associated with different threshold values (e.g., a first policy may be associated with a first threshold value and a second threshold value different from those of a second policy). In some embodiments, one or more policies may be associated with a first threshold but not a second threshold (e.g., a content item is determined to be likely to violate the policy if the distance between the semantic vector of the content item and the closest stored semantic vector is below the first threshold, or not likely to violate the policy if above the first threshold, with no review by an agent). In some embodiments, one or more policies are associated with a second threshold but not a first threshold, such that content items with semantic vectors within the second threshold distance of a stored semantic vector are enqueued for agent review, with no automatic rejection. In some embodiments, under one or more policies, all content items are enqueued for agent review, regardless of the distance between the semantic vector associated with the content item and the stored semantic vectors.

By maintaining a record of semantic vectors for each policy corresponding to the extracted text of content items that have been historically determined to violate the policy, and comparing semantic vectors of extracted text associated with newly received content items with those of the historical content items, content items having extracted text that is semantically similar to policy-violating content items, and thus also likely to violate policy, may be automatically identified. As such, if a content creator creates several variations of a policy-violating content item, the different variations can be automatically detected and prevented from being displayed to users of the online system, with minimal intervention by human agents.

Generating Overall Labels for Stored Semantic Vectors

In some embodiments, a plurality of received content items may have extracted text corresponding to the same semantic vector. As such, a particular semantic vector may be associated with multiple instances of agent review. Each time an agent reviews a content item, the semantic vector of the extracted text of the content item may be "labelled" based upon the result of the agent review. As used herein, a "label" for a semantic vector corresponds to an indication of the suitability of the semantic vector under a particular policy or group of policies. For example, an instance of the semantic vector may have a "suitable" label when a content item associated with the semantic vector is determined by an agent to not violate any policies, or an "unsuitable" label when determined to violate a policy. In some embodiments, the label may further indicate under which policy the semantic vector was determined to violate. For example, a particular instance of the semantic vector may be labelled "unsuitable—policy A" if the content item associated with the vector was determined to violate a particular policy A.

In some embodiments, the agent review data store 318 maintained by the content review system 230 comprises a table or other data structure indicating the results of agent review performed on content items having extracted text associated with semantic vectors. Each instance of agent review is associated with a label (e.g., "suitable", "unsuitable—Policy A", "unsuitable—Policy B", etc.). In some embodiments, different content items associated with text having the same semantic vector may have been subject to agent review at various times. As such, the agent review data store 318 may contain multiple instances of a particular semantic vector and their respective labels resulting from different instances of agent review.

In some embodiments, agents reviewing content items associated with the same semantic vector may come to different conclusions as to the suitability of the content items associated with the semantic vector. As such, the semantic vector may be associated with different labels, and it may be unclear as to whether received content items having extracted text corresponding to the semantic vector are actually allowable under the policy. In some embodiments, an overall label for the semantic vector is determined via majority vote, in which the semantic vector is assigned a label based upon the most common label assigned through agent view. The semantic vector may then be removed from the data stores (rejected semantic stores 308 and/or the suitable semantic store 316) that do not match the overall label. For example, if the overall label of the semantic vector is determined to be "suitable," then the semantic vector is removed from all rejected semantic stores 308, if present. On the other hand, if the overall label of the semantic vector is "unsuitable—Policy A," then the semantic vector is removed from the suitable semantic store 316 as well as all rejected semantic stores 308 that correspond to policies other than "Policy A."

In some embodiments, determining the overall label for the semantic vector may be performed periodically. In other embodiments, the overall label for the semantic may be determined based upon one or more triggering events, such as in response to the semantic vector being subject to agent review at least a threshold number of times, or when a particular policy is being converted from basing all determinations on agent review to being able perform automatic evaluation of content items.

Figure 6:
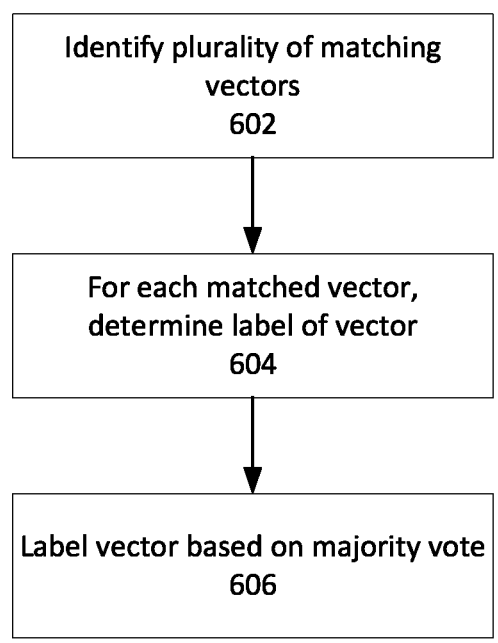
FIG. 6 illustrates a flowchart of a process for determining a label for a semantic vector corresponding to the extracted text of one or more content items, in accordance with some embodiments.

FIG. 6 illustrates a flowchart of a process for determining a label for a semantic vector corresponding to the extracted text of one or more content items, in accordance with some embodiments. The content review system (e.g., the content review system 230) identifies 602 a plurality of matching instances of a semantic vector corresponding to previous instances of agent review. In some embodiments, the content review system accesses a stored table or other data structure (e.g., the agent review data store 318) containing agent review records indicating which content items with extracted text have been reviewed by an agent (e.g., a human agent) and the results of the review indicating whether each reviewed content item is suitable or unsuitable. For example, different content items associated with text having the same semantic vector may have been subject to agent review at various times. As such, in some embodiments, the one or more instances of a particular semantic vector may be identified based upon the stored agent review records. The identified instances of the semantic vector may collectively form a cluster.

The content review system determines 604, for each instance of the semantic vector in the cluster, a label corresponding to the instance. For example, each instance of the semantic vectors identified from stored agent review records is associated with an indication of whether the semantic vector was determined by the reviewing agent to be "suitable" or "unsuitable", and the particular policy, if any, that the semantic vector was determined to be unsuitable under.

The content review system determines 606 an overall label for the semantic vector corresponding to the cluster, based upon the determined labels for each instance of the semantic vector of the cluster. In some embodiments, the overall label for the cluster is determined through a majority vote (e.g., comparing the number of "suitable" labels against the number of "unsuitable" labels in the cluster). In some embodiments, "unsuitable" labels associated with different policies are separated for the purpose of performing majority vote (e.g., "unsuitable—Policy A" is counted separately from "unsuitable—Policy B"). For example, if a cluster corresponding to a particular semantic vector is associated with 5 "suitable" labels, 4 "unsuitable—Policy A" labels, and 2 "unsuitable—Policy B" labels, then the overall label for the cluster will be "suitable", despite the total number "unsuitable" labels outnumbering "suitable" labels. On the other hand, if the cluster were associated with 6 "unsuitable—Policy A" labels, then the overall label of the cluster would be "unsuitable—Policy A." In some embodiments, an overall label is determined for the semantic vector only if a particular label makes up at least a threshold percentage (e.g., >50%) of the total number of labels associated with the cluster.

Once the overall label for the cluster of semantic vectors is determined, instances of the semantic vector may be removed from the rejected semantic store and suitable semantic stores, based on the overall label. For example, if the overall label for the cluster is "unsuitable—Policy A", then all instances of the semantic vector may be removed from the suitable semantic store and rejected semantic stores corresponding to policies other than "Policy A", while an instance of the semantic vector is maintained in the rejected semantic store for "Policy A".

By taking into account multiple instances in which content items associated with a particular semantic vector were reviewed, and determining an overall label for the cluster of semantic vectors, the accuracy of labels for the semantic vector may be increased. For example, in cases where multiple instance of agent review have caused a particular semantic vector to be labelled as "suitable" and "unsuitable" at different times, the aggregation of multiple instances of the semantic vector into a cluster and determining an overall label for the semantic vector is used to more accurately determine whether future occurrences of content items associated with the same semantic vector should be accepted or rejected.

Reviewing Policy Data Stores for False Positives

In some embodiments, the content review system may review the stored semantic vectors corresponding to a policy of the online system to determine whether the semantic vectors stored in the rejected semantic store corresponding to the policy are good indicators of unsuitability under the policy. For example, a first semantic vector corresponding to extracted text of a first content item that is unsuitable under the policy may be similar to a second semantic vector corresponding to extracted text of a second content item that is suitable under the policy, and as such may cause the second content item to be deemed unsuitable and for the second semantic vector to be erroneously stored in the rejected semantic store for to the policy as a false positive. As an example, an online system may have a first policy that disallows content items directed to the selling of services, but allow content items directed to the selling of goods. In some embodiments, the extracted text of a content item directed to the selling of goods (allowed) may be semantically similar to past content items rejected for being directed to the selling of services, and as such may be erroneously rejected under the policy. A false positive stored in a policy data store may cause suitable content items having text that is semantically similar to the false positive to be determined to violate the policy and stored as additional false positives.

As such, it may be desirable to remove from the rejected semantic store for a policy semantic vectors corresponding to extracted text that violates the policy, but are semantically similar to at least a threshold number of semantic vectors corresponding to extracted text that is suitable under the policy. For example, a first piece extracted text may be directed to selling of services (disallowed under policy), but is semantically similar to many pieces of extracted text directed to selling of goods, such that content items associated with those pieces of extracted text are likely to be automatically rejected by the content review system under the policy as false positives. As such, the semantic vector of the first piece of extracted text may be removed from the rejected semantic store despite violating the policy, in order to reduce the chances of false positives.

In some embodiments, the content review system may review stored semantic vectors of each rejected semantic store corresponding to a policy on a periodic basis (e.g., every day), in order to ensure that false positives do not remain in the rejected semantic store for extended periods of time (and potentially causing other false positives to be stored in the rejected semantic store). In some embodiments, false positive semantic vectors can be removed by determining the overall labels for the semantic vectors (e.g., using majority vote as described above). In addition, semantic vectors corresponding to extracted text that violates the policy, but are considered likely to cause non-violating semantic vectors to be determined to violate the policy, may also be removed from the rejected semantic store. In some embodiments, a user (e.g., a human agent associated with the online system) may also initiate review of a particular data store corresponding to a particular policy. In some embodiments, a data store may also be reviewed in response to other criteria being satisfied (e.g., the number of semantic vectors stored in the rejected semantic store reaching a threshold amount).

Referring back to FIG. 3, semantic vectors corresponding to extracted text of received content items determined by the acceptance/rejection module 312 to not violate any policies (through automatic determination or through agent review) may be stored in the suitable semantic store 316. The content review system 230 uses the semantic vectors stored in the suitable semantic store 316 to identify semantic vectors that are not good indicators of the suitability of content items (e.g., false positives, or unsuitable semantic vectors that are similar to at least a threshold number of suitable semantic vectors). As used herein, a pair of semantic vectors are considered "similar" to each other if they are within a threshold distance of each other.

For example, the content review system 230 may analyze one or more semantic vectors of the rejected semantic store 308 to determine one or more similar semantic vectors, and removing a semantic vector from the rejected semantic store 308 based upon a number of similar suitable semantic vectors.

Figure 7:
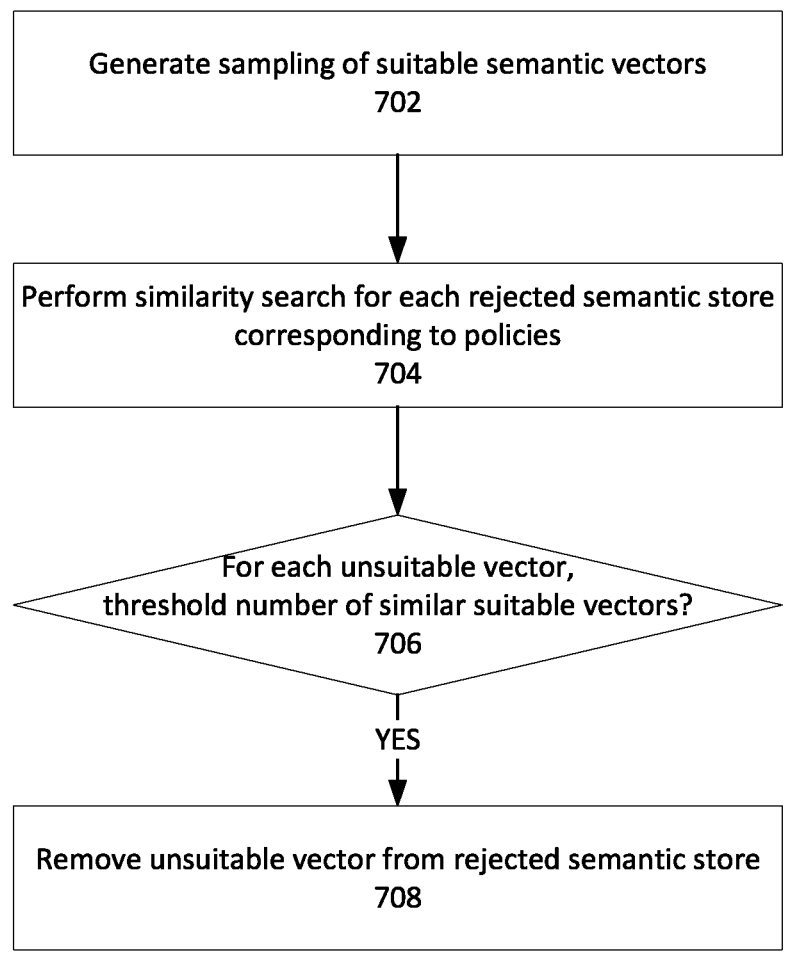
FIG. 7 illustrates a flowchart of a process for reviewing a data store corresponding to a policy, in accordance with some embodiments.

FIG. 7 illustrates a flowchart of a process for reviewing a data store corresponding to a policy, in accordance with some embodiments. The content review system generates 702 a sampling of suitable semantic vectors. For example, the content review system may access the suitable semantic store (e.g., the suitable semantic store 316) and retrieve a random sampling of semantic vectors. In some embodiments, the sampling of suitable semantic vectors comprises a predetermined number of vectors.

The content review system performs 704, for the rejected semantic stores corresponding to one or more different policies, a similarity search using the generated sampling of suitable semantic vectors. In some embodiments, performing the similarity search comprises determining, for each unsuitable semantic vector of the rejected semantic stores, a number of suitable semantic vectors of the sampling that the unsuitable semantic vector is similar to (e.g., having a distance within a threshold value). In some embodiments, the threshold value for determining similarity may be based upon the specific policy associated with the unsuitable semantic vector. In some embodiments, the similar suitable vectors for each unsuitable semantic vector may be determined using a DocNN model or a FANN (fast approximate nearest neighbor) model.

The content review system determines 706, for each unsuitable semantic vector, whether the number of similar suitable vectors of the sampling of suitable semantic vectors exceeds a threshold value. In some embodiments, the threshold value is a predetermined value, or may be based upon the total number of sampled similar vectors (e.g., a percentage of the total number of suitable vectors within the sampling).

In some embodiments, the content review system may weigh the identified suitable similar vectors based upon a level of similarity between the unsuitable semantic vector and the identified suitable similar vectors, and calculate an aggregate metric based upon the weighted suitable similar vectors. For example, similar suitable vectors that are more similar to the unsuitable semantic vector (e.g., have a smaller distance to the unsuitable semantic vector) may be weighed more heavily in comparison to similar suitable vectors that are less similar. The aggregate metric may then be compared against a threshold value.

If the number of suitable similar vectors to the unsuitable semantic vector satisfies the threshold value (or the aggregate metric satisfies the threshold value), then the content review system may 708 deem the unsuitable semantic vector to be too similar to suitable semantic vectors for the purpose of performing automatic rejection, and remove the unsuitable semantic vector from the rejected semantic store. In some embodiments, unsuitable semantic vectors removed from the rejected semantic stores may be maintained and stored in a separate data store (e.g., agent review semantic store, not shown) and used to determine if a received content item should be subject to agent review. For example, if the semantic vector of the extracted text corresponding to a received content item is determined to be similar to a semantic vector of a rejected semantic store, the semantic vector of the content item may be automatically labelled "unsuitable." On the other hand, if the semantic vector is similar to a semantic vector of the agent review semantic store, the content item is submitted for agent review instead of automatically labelled "unsuitable."

In some embodiments, the process described in relation to FIG. 7 is performed periodically. By periodically assessing the stored semantic vectors associated with each policy against the semantic vectors of suitable content items, the content review system removes semantic vectors of false positive content items and semantic vectors that are not good indicators of suitability from the rejected semantic stores corresponding to each policy, potentially improving the accuracy of the content review system when reviewing subsequent content items.

Alternative Embodiments

The foregoing description of the embodiments of the invention has been presented for the purpose of illustration; it is not intended to be exhaustive or to limit the invention to the precise forms disclosed Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer Such a computer program may be stored in a non-transitory, tangible computer readable storage medium, or any type of media suitable for storing electronic instructions, which may be coupled to a computer system bus Furthermore, any computing systems referred to in the specification may include a single processor or may be architectures employing multiple processor designs for increased computing capability.

Embodiments of the invention may also relate to a product that is produced by a computing process described herein Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by an online system, at least a first content item and a second content item;
extracting a first extracted text and a second extracted text associated with the first and second content items respectively;
determining a first semantic vector of the first extracted text indicating one or more semantic features of the first extracted text and a second semantic vector of the second extracted text indicating one or more semantic features of the second extracted text, by:
providing the first and second extracted text as input to a deep neural network having a plurality of layers;
receiving from the deep neural network an output corresponding to the first and second semantic vectors of the first and second extracted texts;
identifying a set of stored unsuitable semantic vectors that have been previously determined to be unsuitable under a policy of the online system, the policy specifying one or more attributes of content items considered unsuitable for presenting to users of the online system;
determining a first distance metric value between the determined first semantic vector and one or more semantic vectors of the set of unsuitable semantic vectors, and a second distance metric value between the determined second semantic vector and one or more semantice vectors of the set of unsuitable semantic vectors; and
responsive to determining that the first distance metric value is below a first threshold value, determining that a probability that the first content item violates the policy is at least a first threshold probability, and withholding the first content item from users of the online system; and
responsive to determining that the second distance metric value is above the first threshold value but below a second threshold value, determining that the probability that the second content item violates the policy is between the first threshold probability and a second threshold probability, and enqueuing the second content item or the second extracted text for review by a human agent.

2. The method of claim 1, further comprising, responsive to determining that the probability of the first content item violating the policy is at least the first threshold probability, adding the determined first semantic vector to the set of stored unsuitable semantic vectors.

3. The method of claim 1, wherein the first extracted text corresponds to body text of the first content item.

4. The method of claim 1, wherein the first extracted text corresponds to text of a landing page associated with the first content item.

5. The method of claim 1, wherein the determined first and second semantic vectors are obtained by applying a hash function to an output of a hidden layer of the deep neural network.

6. The method of claim 1, further comprising:
identifying a set of stored suitable semantic vectors that have each been previously determined to be suitable under the policy of the online system;
for an unsuitable semantic vector of the set of stored unsuitable semantic vectors, determining a number of sematic vectors, from the set of stored suitable semantic vectors, that are within a threshold distance of the unsuitable semantic vector; and
in response to the determined number of semantic vectors within the threshold distance meeting or exceeding a threshold value, removing the unsuitable semantic vector from the set of stored unsuitable semantic vectors.

7. The method of claim 1, further comprising:
identifying a data store comprising instances of a plurality of semantic vectors, each instance having a label indicating whether a semantic vector of the plurality of semantic vectors corresponding to the instance was previously determined to violate the policy as a result of review by an agent;
accessing the data store to identify a plurality of instances associated with a particular semantic vector of the plurality of semantic vectors;
generating a cluster corresponding to the identified plurality of instances corresponding to the particular semantic vector;
identifying labels of the instances of the generated cluster;
determining whether the particular semantic vector violates the policy, based upon the identified labels; and
responsive to determining that the particular semantic vector violates the policy, adding the particular semantic vector to the set of unsuitable semantic vectors associated with the policy.

8. The method of claim 1, wherein the first distance metric comprises a Euclidean distance.

9. The method of claim 1, wherein the first and second semantic vectors are outputs by a hidden layer of the deep neural network.

10. The method of claim 1, further comprising:
identifying a second set of stored, unsuitable semantic vectors different from the set of stored unsuitable semantic vectors and wherein the second set of stored unsuitable semantic vectors has been previously determined to be unsuitable under a second policy of the online system;
determining a third distance metric value between the determined first semantic vector and one or more semantic vectors of the second set of stored unsuitable semantic vectors;
responsive to determining that the third distance metric value is below a third threshold value different from the first threshold value, withholding the first content item from users of the online system.

11. The method of claim 1, further comprising:
identifying a second set of stored unsuitable semantic vectors different from the set of stored unsuitable semantic vectors and wherein the second set of stored unsuitable semantic vectors has been previously determined to be unsuitable under a second policy of the online system;
determining a third distance metric value between the determined second semantic vector and one or more semantic vectors of the second set of stored unsuitable semantic vectors;
responsive to determining that the third distance metric value is below a third threshold value different from the first threshold value, withholding the second content item from users of the online system, without enqueuing the second content item or the second extracted text for review by the human agent.

12. The method of claim 11, wherein, responsive to determining that the third distance metric value is below the third threshold value different from the first threshold value, determining that a probability that the second content item violates the second policy is at least the first threshold probability.

13. A non-transitory computer readable storage medium configured to store program code, the program code comprising instructions that when executed by a processor cause the processor to:
receive, by an online system, a content item;
extract text associated with the content item;
determine a semantic vector of the extracted text indicating one or more semantic features of the extracted text, by:
providing the extracted text as input to a deep neural network having a plurality of layers;
receiving from the deep neural network an output corresponding to the semantic vector of the extracted text;
identify a set of stored unsuitable semantic vectors that have been previously determined to be unsuitable under a policy of the online system, the policy specifying one or more attributes of content items considered unsuitable for presenting to users of the online system;
determine a distance metric value between the determined semantic vector and one or more semantic vectors of the set of unsuitable semantic vectors; and
responsive to determining that the distance metric value is below a first threshold value, determining that a probability that the content item violates the policy is at least a first threshold probability, and withholding the content item from users of the online system; and
responsive to determining that the distance metric value is above the first threshold value but below a second threshold value, determining that the probability that the content item violates the policy is between the first threshold probability and a second threshold probability, and enqueuing the content item or the extracted text for review by a human agent.

14. The non-transitory computer readable storage medium of claim 13, wherein the program code further causes the processor to, responsive to determining that the probability of the content item violating the policy is at least the threshold probability, add the determined semantic vector to the set of stored unsuitable semantic vectors.

15. The non-transitory computer readable storage medium of claim 13, wherein the extracted text corresponds to body text of the content item.

16. The non-transitory computer readable storage medium of claim 13, wherein the extracted text corresponds to text of a landing page associated with the content item.

17. The non-transitory computer readable storage medium of claim 13, wherein the determined semantic vector is obtained by applying a hash function to an output of a hidden layer of the deep neural network.

18. The non-transitory computer readable storage medium of claim 13, wherein the program code further causes the processor to:
  identify a set of stored suitable semantic vectors that have each been previously determined to be suitable under the policy of the online system;
  for an unsuitable semantic vector of the set of stored unsuitable semantic vectors, determine a number of sematic vectors, from the set of stored suitable semantic vectors, that are within a threshold distance of the unsuitable semantic vector; and
  in response to the determined number of semantic vectors within the threshold distance meeting or exceeding a threshold value, remove the unsuitable semantic vector from the set of stored unsuitable semantic vectors.

19. The non-transitory computer readable storage medium of claim 13, wherein the program code further causes the processor to:
  identify a data store comprising instances of a plurality of semantic vectors, each instance having a label indicating whether a semantic vector of the plurality of semantic vectors corresponding to the instance was previously determined to violate the policy as a result of review by an agent;
  access the data store to identify a plurality of instances associated with a particular semantic vector of the plurality of semantic vectors; the data store to generate a cluster corresponding to a plurality of instances of a semantic vector of the plurality of semantic vectors
  generate a cluster corresponding to the identified plurality of instances corresponding to the particular semantic vector;
  identify labels of the instances of the generated cluster;
  determine whether the particular semantic vector violates the policy, based upon the identified labels; and
  responsive to determining that the particular semantic vector violates the policy, add the particular semantic vector to the set of unsuitable semantic vectors associated with the policy.

20. The non-transitory computer readable storage medium of claim 13, wherein the distance metric comprises a Euclidean distance.

* * * * *